US007646395B2

(12) United States Patent  
Chatting et al.

(10) Patent No.: US 7,646,395 B2
(45) Date of Patent: Jan. 12, 2010

(54) ADAPTIVE CLOSED GROUP CARICATURING

(75) Inventors: David J Chatting, Suffolk (GB); Adam Shadbolt, Hertfordshire (GB); Jeremy M Thorne, Suffolk (GB)

(73) Assignee: British Telecommunications plc, London (GB)

( * ) Notice: Subject to any disclaimer, the term of this patent is extended or adjusted under 35 U.S.C. 154(b) by 153 days.

(21) Appl. No.: 10/585,785

(22) PCT Filed: Dec. 31, 2004

(86) PCT No.: PCT/GB2004/005419

§ 371 (c)(1),
(2), (4) Date: Jul. 11, 2006

(87) PCT Pub. No.: WO2005/069226

PCT Pub. Date: Jul. 28, 2005

(65) Prior Publication Data
US 2007/0247471 A1 Oct. 25, 2007

(30) Foreign Application Priority Data
Jan. 15, 2004 (GB) .................. 0400894.2

(51) Int. Cl.
*G09G 5/00* (2006.01)
(52) U.S. Cl. .................. 345/646; 345/621; 345/643
(58) Field of Classification Search .................. 345/609, 345/639, 646, 621, 642
See application file for complete search history.

(56) References Cited

U.S. PATENT DOCUMENTS 4,698,682 A * 10/1987 Astle .................. 348/586
5,850,463 A * 12/1998 Horii .................. 382/118
6,229,904 B1 * 5/2001 Huang et al. .................. 382/100
6,556,196 B1 * 4/2003 Blanz et al. .................. 345/419
6,775,397 B1 * 8/2004 Hamalainen .................. 382/118
2002/0024528 A1 * 2/2002 Lambertsen .................. 345/646

OTHER PUBLICATIONS

Bouton et al. "Inside Adobe Photoshop 5" Copyright May 1998, pp. 93, 266-267, 274, 269-271.*
Dayton et al. "Photoshop 5/5.5 Wow! Book" Copyright 2000, pp. 80, 90-91.*
International Search Report dated Feb. 28, 2005.
UK Search Report dated Jun. 18, 2004.
Fujiwara et al., "Web-PICASSO: Internet Implementation of Facial Caricature System PICASSO", Lecture Notes in Computer Science, vol. 1948, 2000, pp. 151-159.
Fujiwara et al. "Age and Gender Estimation by Modeling Statistical Relationship Among Faces", Proc. of SPIE, vol. 5132, 2003, pp. 559-566.
Brennan, "Caricature Generator: The Dynamic Exaggeration of Faces by Computer", Leonardo, Pergamon Press, Oxford, GB, vol. 18, No. 3, 1985, pp. 170-178.

* cited by examiner

*Primary Examiner*—Ulka Chauhan
*Assistant Examiner*—Jeffrey J Chow
(74) *Attorney, Agent, or Firm*—Nixon & Vanderhye PC

(57) ABSTRACT

Caricatured images of subjects are generated wherein the caricatured image of each subject is adapted when subjects join and leave a closed group of which they are members. By adapting the caricatured images in this manner, it can be ensured that each caricatured image remains maximally distinguishable from the other images in the group, thus ensuring that recognition of the images may be maintained at a high level.

19 Claims, 10 Drawing Sheets (b)

(a)

ADAPTIVE CLOSED GROUP CARICATURING

This application is the U.S. national phase of international application PCT/GB2004/005419 filed 31 Dec. 2004 which designated the U.S. and claims benefit of GB 0400894.2, dated 15 Jan. 2004, the entire content of which is hereby incorporated by reference.

BACKGROUND

1. Technical Field

The present invention relates to a method and system for generating caricatured images of subjects based on a closed-group of subjects. In particular the invention is concerned with adaptively generating caricatures in dependence on subjects joining and leaving the closed group.

2. Related Art

Automatic caricaturing methods and systems are already known in the art. Brennan, S. E. in "Caricature Generator: The Dynamic Exaggeration of Faces by Computer." Leonardo, Vol.18 no.3, pp. 170-178 describes a computational model of caricature which allowed a two dimensional line drawn caricature to be generated from photographs. The user traces over the original image (by placing a set of markers over the image) to generate a line drawing of the subject. An example of such an original image and the resulting line drawing are shown in FIG. 15. Here, an original image as shown in FIG. 15(a) results in a line drawing as shown in FIG. 15(b).

Having obtained the line drawing of the subject, this drawing is then compared with a corresponding line drawing of a "mean" or "prototype" face, by which is meant an average face of a group usually comprising the same race, gender, and colour as the subject. Thus, for the white Caucasian male shown in FIG. 15(a), usually a prototype face of an "average" white Caucasian male would be used. In some circumstances prototype faces from different ethnic groups may be used.

Rowland et al in "Transforming Facial Images in 2 and 3-D". Imagina 97—Conferences—ACTES/Proceedings, Feb, Monte Carlo, (1997), pp159-175 describe how a prototype face may be derived as follows. A prototype can be defined as being a representation of the consistencies across a collection of faces. For example, a prototypical male Caucasian face would contain all that is consistent about Caucasian faces and can be generated by calculating a mean face from a set of Caucasian faces.

To derive the prototypical shape for a group of faces, the delineation data for each face are first "normalised", making the faces nominally of the same size and orientation. The left and right pupil centres provide convenient landmark points for this process. The first step is to calculate the average left and right eye positions for the whole population. The next step is to apply a uniform translation, scaling, and rotation to the (x, y) positions of all the feature points, thus normalising each face to map the left eye to the average left eye position and the right eye to the average right eye position. This process maintains all the spatial relationships between the features within each face but standardises face size and alignment. It is then possible to calculate the average positions of each remaining template feature point (after alignment), the resulting data constituting the mean shape for the given population. A line drawing of the resulting "mean" or prototype face can then be obtained. An example line drawing of a mean face is shown in FIG. 16.

Once a prototype has been formed for a collection of faces it is possible to generate caricatures by accentuating the difference between an individual face and a relevant prototype. After normalising the feature location data from the prototype to the eye positions of an example face, all feature points on the example face can be shifted away from their counterparts on the prototypical face by a given percentage, as shown in FIG. 9. This percentage is the amount of caricature and can be thought of as extrapolating a morph between a prototype and the example face. If the percentage is 100% then the product of the manipulation will be the prototype, if the percentage is 50% then the result will be halfway along the morph between the prototype and the example face, if the percentage is 0% then the example face is returned, if it is −50% then a caricature of the original face is the result. More generally, any percentage less than 0% will result in a caricatured face. Equation 1.1 expresses Brennan's caricaturing algorithm in a mathematical form.

$$Q = P + b(P - S), \qquad \text{(Equation 1.1)}$$

Where:

Q is the feature point of the caricature model,

P is the feature point of the individual head model,

S is the feature point of the average mean head model and b is a coefficient for caricaturing.

An example caricature image of the line drawing of FIG. 15(b) generated according to the Brennan algorithm, and using a caricature coefficient b of 20% is shown in FIG. 17.

Benson and Perrett in "Synthesising continuous-tone caricatures." Image and Vision Computing, 9, 123-9 extended the technique to produce photographic caricatures using computer-morphing techniques. However the basic underlying caricaturing algorithm is the same as Brennan. Moreover the same caricaturing technique is easily extended into 3D by applying the caricaturing algorithm to every vertex or to 3D-mesh control points, as described in Fujiwara, T., Nishihara, T., Tominaga, M., Kato, K. (1998) "On the Detection of Feature Points of 3D Facial Image and Its Application to 3D Facial Caricature." and Shadbolt, A. (2003) "From 2D photographs to 3D caricatures." http://www.dcs.shef.ac.uk/~u0as2 respectively. When the caricaturing algorithm is applied to the control points of the mesh the resulting caricatured control points are then interpolated over the rest of the mesh to produce the 3D caricature. FIG. 10 shows a 3D-caricature (right) produced from the original 3D head model (left) and the mean model.

With respect to other aspects of computational caricatures, it has also been shown in Rhodes, G. & Brennan, S. E. (1987). Identification and Rating of Caricatures: Implications for Mental Representations of Faces. Cognitive Psychology, 19, 473-497 that caricaturing of faces results in greater recognition of the caricature face as the subject than an un-caricatured face. An example of this is given in *In the Eye of the Beholder—The Science of Face Perception*, Bruce, V. and Young, A. 2000, ISBN 0-190852439-0 at p.121-123, where photographs of two identical twins are manipulated to provide an "average" image of the two photographs, and differences identified between the "average" image and the actual photographs. Further image manipulation is then performed in dependence on the identified differences to exaggerate the differences, thus highlighting the differences which are available for their friends and families to learn so as to be able to identify each twin. In effect, within this work a closed group of subjects (the two twins) is formed, a mean of the closed group is taken, and then the images of the subjects are caricatured away from this mean so as to render the images more recognisable. The precise image manipulations used to perform the caricaturing are described in Chapter 5 of the book.

Although the above work by Bruce and Young introduces the concept of the formation of a mean image from a closed group, and the exaggeration of images of members of the group away from that mean so as to render them recognisable, problems remain in practical implementations of such techniques where the members of the group may change over time.

BRIEF SUMMARY

The present invention presents a practical application of the closed group image exaggeration concept presented by Bruce and Young by providing a method and system for generating caricatured images of subjects who are members of a closed group, where the membership of the closed group may change over time. More particularly, the present invention presents a method and system for generating caricatured images of subjects wherein the caricatured image of each subject is adapted when subjects join and leave a closed group of which they are members. By adapting the caricatured images in this manner, it can be ensured that each caricatured image remains maximally distinguishable from the other images in the group, thus ensuring that recognition of the images may be maintained at a high level.

In view of the above, from a first aspect there is provided a method of generating a caricatured image, comprising the steps of:

storing image representations of subjects and corresponding respective caricatured image representations of the subjects;

receiving an image representation of a new subject; and generating a caricatured image representation of the new subject in dependence on the stored image representations of the subjects and the received image representation of the new subject.

In the first aspect, when a new member wishes to join a closed group of subjects, a caricatured image of the member exaggerating the differences between the new member and the existing members can be created by taking into account the images of the existing members when generating the caricature of the new member. In this way the caricature image of the new member will be maximally distinguishable from the other caricature image representations.

From a second aspect, the invention further provides a method of generating caricatured images, comprising the steps of:

storing image representations of subjects and corresponding respective caricatured image representations of the subjects;

receiving an image representation of a new subject; and generating replacement caricatured image representations of the subjects in dependence on the stored image representations thereof and the received image representation of the new subject.

In the second aspect, when a new member wishes to join a closed group of subjects, replacement caricatured images of the existing members exaggerating the differences between the members can be created by taking into account the images of the existing members and the new member. In this way the replacement caricature images of the members will be maintained as maximally distinguishable from each other.

Within the second aspect there preferably further is included the step of generating a caricatured image representation of the new subject in dependence on the stored image representations of the subjects and the received image representation of the new subject. In such a case both replacement caricature images of the existing member, and a new caricatured image of the new member are created, all of which are maximally distinguishable from each other.

In either the first or second aspects of the invention the generating steps preferably further comprise generating the caricatured image representations in weighted dependence on the received image representation of the new subject, wherein a weighting factor associated with the new image representation generally increases with time, and the caricature image representations are re-generated each time the weighting factor is adapted. This will avoid dramatic and potentially disturbing step changes to any particular member's caricature image representation, allowing the impact of the new member to be gradually incorporated into the group over time.

From a third aspect there is further provided a method of generating caricatured images, comprising the steps of:

storing image representations of subjects and corresponding respective caricatured image representations of the subjects;

receiving a leave signal indicating a particular one or more of the subjects for which image representations are stored; and generating replacement caricatured image representations in dependence on the stored image representations of the subjects at least partially discounting the image representations of the indicated subjects.

Within the third aspect where caricature images of a group of subjects are already in existence, when a subject wishes to leave the group replacement caricature images can be generated based on the remaining group members, but at least partially taking into account the image representations of the subjects who are to leave the group, if desired. This allows for the caricature image representations to be modified such that they may remain maximally distinguishable from each other, but by at least partially including the image representations of the members who have left the group in the generation process step changes in appearance may be avoided, if desired.

Preferably, within the third aspect the image representations of the indicated subjects are generally increasingly discounted over time in accordance with a weighting factor, wherein the caricature image representations are re-generated each time the weighting factor is adapted. This allows for the subjects who have left the group to have a decreasing impact on the generated caricatures over time.

From a fourth aspect the present invention further provides a computer program or suite of computer programs arranged such that when executed by a computer system it/they cause the computer system to operate according to any of the aforementioned first, second, or third aspects.

Moreover, from a fifth aspect, there is also provided a computer readable storage medium arranged to store a computer program according to the fourth aspect of the invention. The computer readable storage medium may be any magnetic, optical, magneto-optical, solid-state, or other storage medium capable of being read by a computer.

From a sixth aspect the present invention further provides a system for generating a caricatured image, comprising:

storage means arranged in use to store image representations of subjects and corresponding respective caricatured image representations of the subjects;

input means for receiving an image representation of a new subject; and processing means arranged in use to generate a caricatured image representation of the new subject in dependence on the stored image representations of the subjects and the received image representation of the new subject.

Within the sixth aspect corresponding advantages and further features as previously described in respect of the first aspect are obtained.

From a seventh aspect the invention also provides a system for generating caricatured images, comprising:

storage means arranged in use to store image representations of subjects and corresponding respective caricatured image representations of the subjects;

input means for receiving an image representation of a new subject; and processing means arranged in use to generate replacement caricatured image representations of the subjects in dependence on the stored image representations thereof and the received image representation of the new subject.

Within the seventh aspect corresponding advantages and further features as previously described in respect of the second aspect are obtained.

Additionally, from an eighth aspect of the invention there is provided a system for generating caricatured images, comprising:

storage means arranged in use to store image representations of subjects and corresponding respective caricatured image representations of the subjects;

means for receiving a leave signal indicating a particular one or more of the subjects for which image representations are stored; and processing means arranged in use to generate replacement caricatured image representations in dependence on the stored image representations of the subjects but at least partially discounting the image representations of the indicated subjects.

Within the eighth aspect corresponding advantages and further features as previously described in respect of the third aspect are obtained.

BRIEF DESCRIPTION OF THE DRAWINGS

Further features and advantages will become apparent from the following description of embodiments of the present invention, presented by way of example only, and by reference to the accompanying drawings, wherein like reference numerals refer to like parts, and wherein:

FIG. 15($b$) is a drawing of an example input image representation corresponding to FIG. 15($a$), and of the type used by the prior art Brennan algorithm, and also by some embodiments of the invention;

DETAILED DESCRIPTION OF EXEMPLARY EMBODIMENTS

An example embodiment of the invention will now be described with respect to FIGS. 1 to 3, and 11 to 14. Example output caricatured image representation which may be generated by the described embodiment of the invention will further be described with respect to FIGS. 4 to 6, and then an example application which may make use of the concept of the invention will be described with respect to FIGS. 7 and 8.

The embodiment of the invention provides an adaptive closed group caricaturing method and system which is primarily implemented in software, and which employs known prior art computational caricaturing algorithms, such as those described in Brennan referenced earlier, or the applicant's own "feature based caricaturing" algorithm described in the present applicant's earlier co-pending United Kingdom patent application No. 0311208.3 filed 15$^{th}$ May 2003, a copy of which is filed concurrently herewith so as to be available on the file of this application. In particular, the embodiments of the invention provide for the caricature image representations of members of the closed group to be adapted in dependence on members joining and leaving the group.

Figure 1:
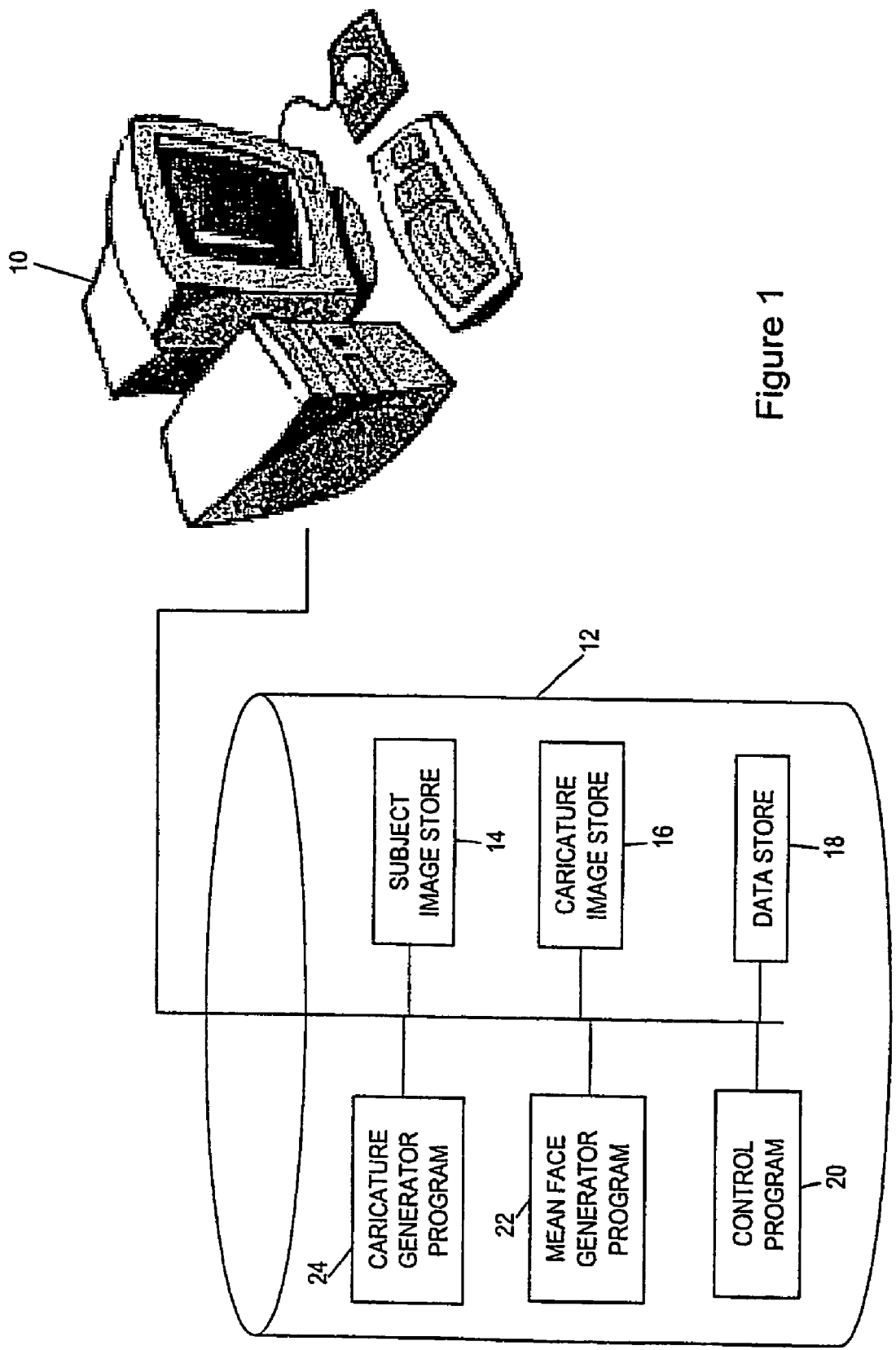
FIG. 1 is an illustration of a computer system which may form the operating environment for the present invention, together with an indication of the various computer programs and data which are required by the embodiment of the invention.

In order to provide the above functionality, according to an embodiment of the invention, and with reference to FIG. 1, a general purpose computer system 10 is provided, which is equipped with a computer readable storage medium such as a hard disk drive, optical drive, dvd drive, or the like, 12, upon which is stored various data and computer executable programs which in use control the general purpose computer system to perform the invention. More particularly, provided on the computer readable storage medium 12 is a caricature generator program 24, a mean face generator program 22, a control program 20, a subject image store 14, a caricature image store 16 and a data store 18. The operations of each of the programs 20, 22, and 24, and the contents of the various stores 14, 16, and 18 will be described in detail later.

Figure 14:
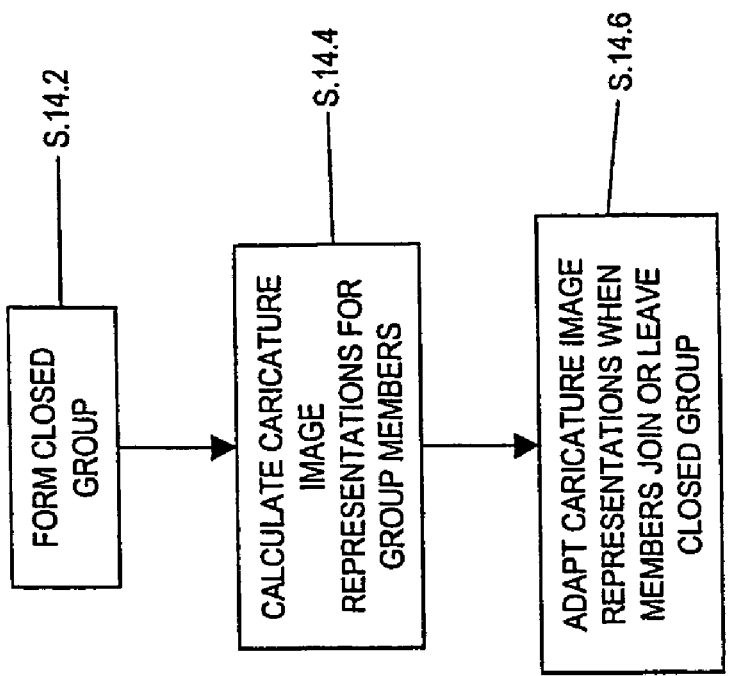
FIG. 14 is a flow diagram illustrating steps performed by the described embodiments of the invention.

As mentioned above, the aim of the embodiments of the invention are to provide an adaptive closed group caricaturing process and system, and FIG. 14 illustrates the general steps involved in such a method and system. In particular, with reference to FIG. 14, at step 14.2 the first operation performed by embodiments of the invention is to form a closed group of members, and how this is performed will ultimately depend upon the application to which the embodiments of the invention are put. For example, in a group conferencing application or online gaming application, individual users may register with a central server or the like, and transmit facial images of themselves to the server for processing into caricatures. However this step is performed, at the end of step 14.2 a closed group of members, and their facial image representations has been obtained.

Figure 11:
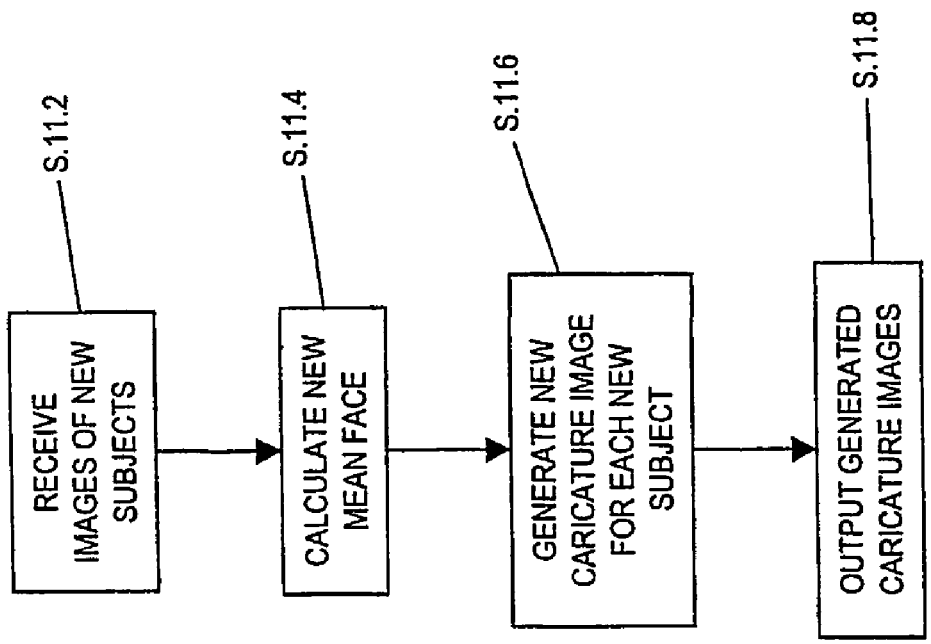
FIG. 11 is a flow diagram illustrating steps performed by the described embodiments of the invention.

The next step to be generally performed at step 14.4 is to calculate caricature image representations for the group members. The individual steps involved in step 14.4 are illustrated in FIG. 11. Here, at step 11.2 the images of the members which form a closed group are received. Next, at step 11.4 these images are used to calculate a new mean or "prototype" facial image, and this may be performed in the same manner as described previously with respect to the Brennan prior art. The output of step 11.4 is therefore a mean facial image which corresponds to the mean of the closed group of images received at step 11.2. Therefore the mean face calculated at step 11.4 is influenced only by the facial image representations of the closed group members, and by no other facial image representations. It is the average facial image of the closed group members but of no one else.

Having calculated such a closed group mean face, at step 11.6 a new caricature image is generated for each member of the closed group using the mean face calculated at step 11.4. As mentioned previously, the precise computational caricature algorithm which may be employed in embodiments of the invention may be any of those already known in the art, such as the Brennan algorithm, or the applicant's own "feature based caricaturing" algorithm, referenced earlier. Commonly, such algorithms allow the user to set a caricaturing coefficient (b) which determines the level of caricaturing applied, and where this is necessary or available step 11.6 preferably includes steps where the user is asked to set such a level. Howsoever the caricaturing is performed, the results of step 11.6 are, however, that a caricatured image representation is obtained for each member of the closed group using the mean face of the closed group. As discussed in the introduction, the use of the closed group mean face ensures that the resulting caricatured image representations are maximally distinguishable from each other.

Once each new caricature has been generated, the caricatured images can be output for display and/or storage at step 11.8.

Returning to. FIG. 14, once the process steps of FIG. 11 have been performed at step 14.4, the result is that a closed group of members has been formed, and that caricature images are available for each of the members in the closed group. According to embodiments of the invention, however, once the initial closed group caricature image representations have been obtained, at step 14.6 the obtained caricature image representations are adapted whenever members join or leave the closed group. As discussed previously, this ensures that the caricatured image representations remain maximally distinguished from each other, and hence the recognisability of each image is maintained even though members may have joined or left the closed group.

In view of the above-described overall operation of embodiments of the invention, returning to FIG. 1 the above described operation can be related to the various programs and stores provided on the computer readable storage medium 12. More particularly, in order to form the initial closed group of caricature image representations, the facial images of the members of the closed group are stored in the subject image store 14. The mean face generator program 22 then operates at step 11.4 to calculate the new mean face using the stored subject images, and the new closed group mean face is stored in the data store 18. The closed group mean face is then used at step 11.6 together with each respective closed group member facial image retrieved from the subject image store 14 by the caricature generator program 24 to generate each new caricature image representation. Each generated caricature image representation is stored in the caricature image store 16. The operation of each of the caricature generator program 24 and the mean face generator program 22 is coordinated overall by the control program 20.

Figure 6:
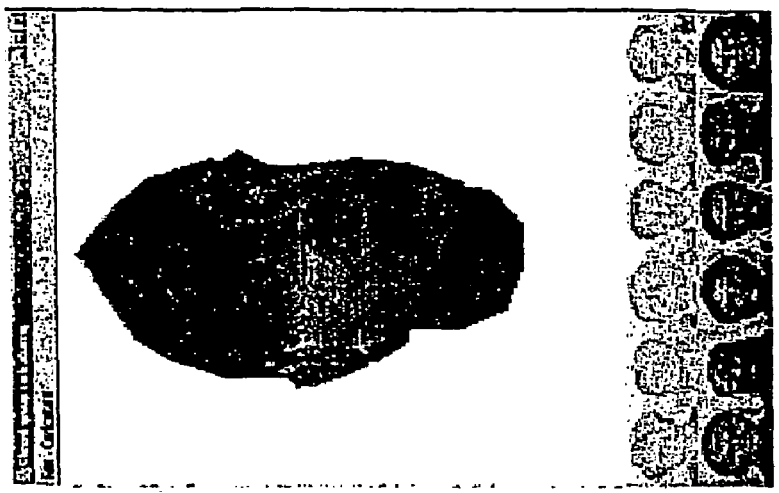
FIG. 6 is a third example of a caricature image representation generated by the described embodiment of the invention.
Figure 5:
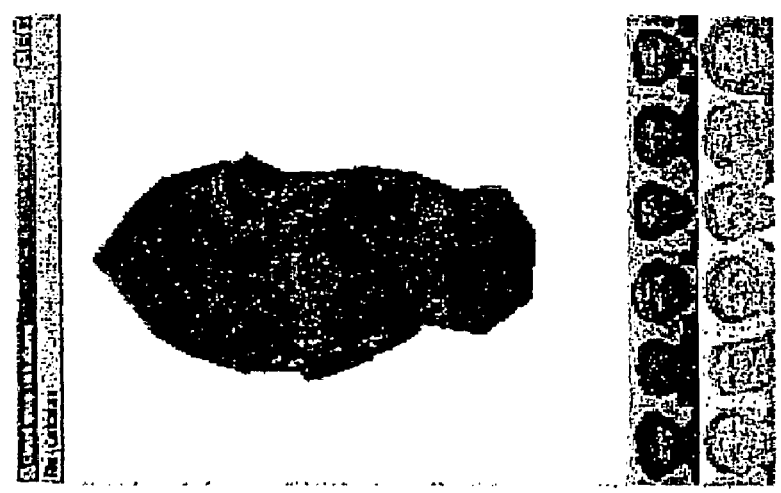
FIG. 5 is a second example caricature image representation generated by the described embodiment of the invention.
Figure 4:
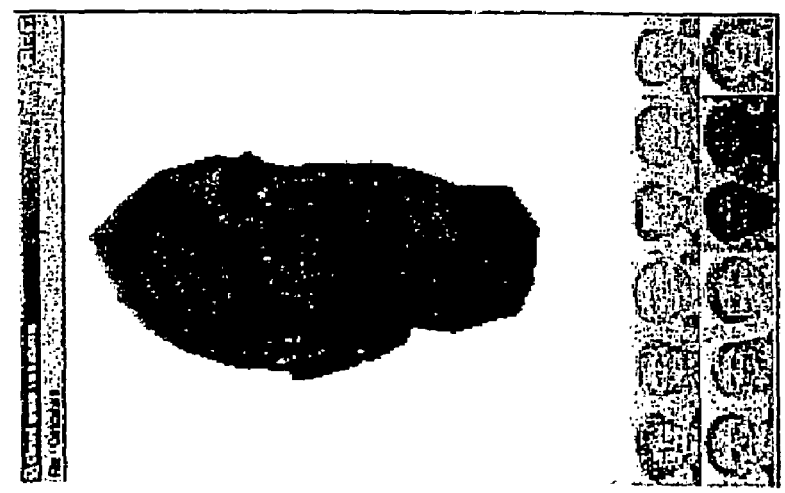
FIG. 4 is an example caricature image representation generated by the described embodiment of the invention.

Example closed group caricature image representations are shown in FIGS. 4, 5, and 6. In FIG. 4, the closed group comprises the two members whose facial images are highlighted on the bottom row of the images in the window. The resulting virtual reality style "3D" caricature image representation is then shown directly above. Similarly, in FIG. 5, and FIG. 6, the closed group which has been used as the basis for the mean face used in the caricaturing process are illustrated by the highlighted facial images at the bottom of the each window. From a comparison of each of the caricatured image representations of FIGS. 4, 5, and 6, it will be seen that for each different closed group which is used to form the mean face, a different caricatured image representation of the same person is achieved. Although the differences are slight, as demonstrated by the work of Bruce and Young concerning the identical twins even the slight exaggeration of differences in appearances between group members will aid in the recognition thereof.

Figure 8:
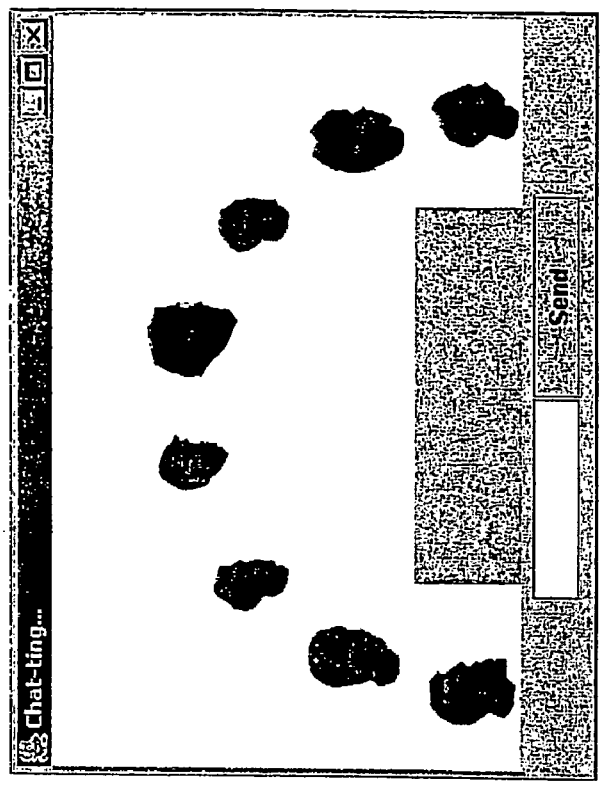
FIG. 8 is further screen shot of an example application program which may make use of the embodiment of the invention.
Figure 7:
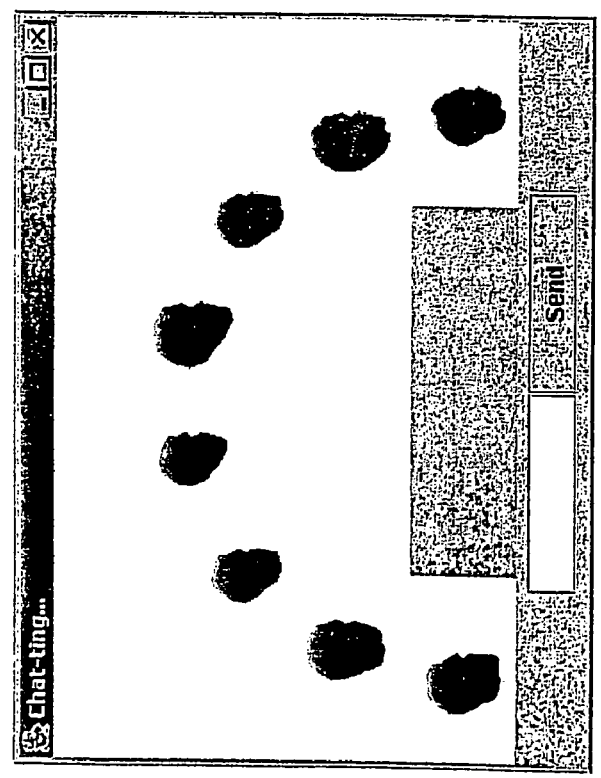
FIG. 7 is a screen shot of an example application program which may make use of the embodiment of the invention.
Figure 10:
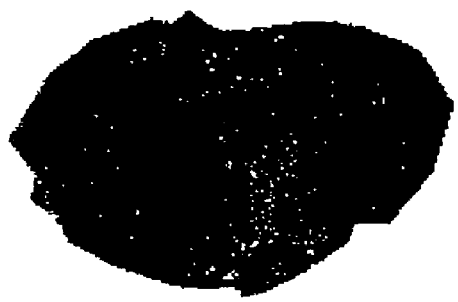
FIG. 10 is an example of caricature image representations generated using prior art techniques.
Figure 10:
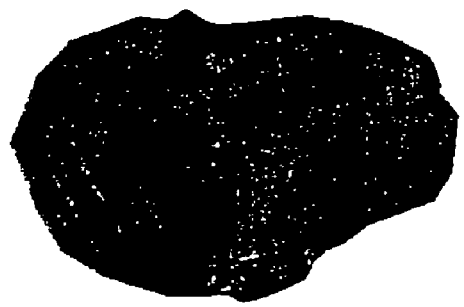
Figure 9:
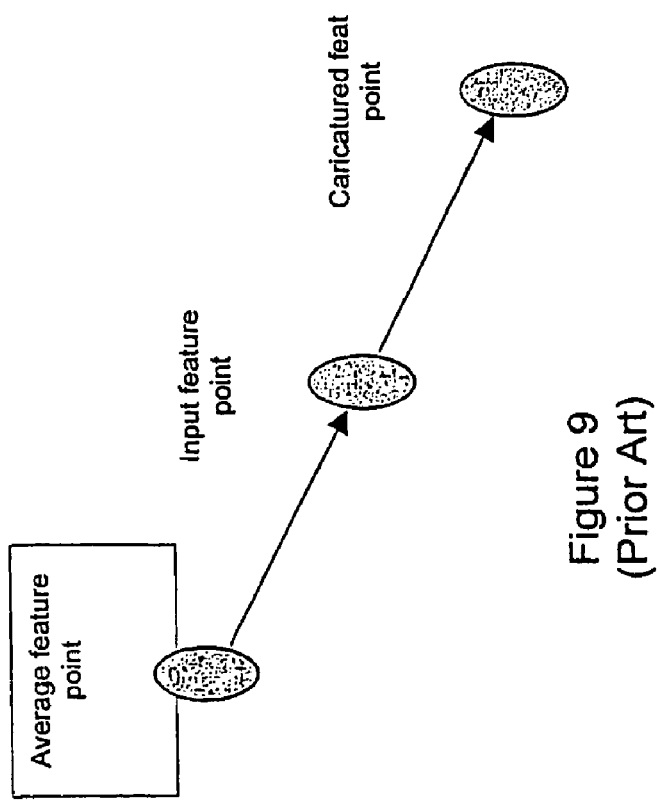
FIG. 9 is a diagram illustrating the concept of the Brennan characturing algorithm of the prior art.

A further example application of the use of closed group caricaturing is shown in FIG. 7. In particular, FIG. 7 illustrates the graphical user interface to a group messaging application, wherein each member of the group is represented by a facial image as shown. FIG. 7 illustrates the facial images when not subject to caricaturing. In FIG. 8, however, the basic facial images of FIG. 7 have been replaced by caricatured image representations for each member of the closed group, which have been generated using a mean face obtained by taking the mean of the facial images of FIG. 7. Comparing FIG. 8 to FIG. 7, it will be seen that the distinctive features of each of the facial images of the members of the group have been emphasised in FIG. 8, thus rendering each individual member more recognisable. As an aside, the group messaging application operates by displaying a message to the user, together with an indication of which of the group members sent the message. A user can send his own message by filling in the input box, and clicking on the send button. Such a simple messaging application is well known in the art, but the graphical user interface using the closed group caricatured image representations improves the recognisability of each of the individual members.

Thus far, we have concerned ourselves with how the initial group caricature image representations are obtained, and how they may be used. Embodiments of the invention, however, are concerned with how the closed group caricature image representations may be adapted, when members of the closed group join or leave the group. How member joins or leaves are handled will now be described with respect to FIGS. 2 and 3 respectively.

Figure 2:
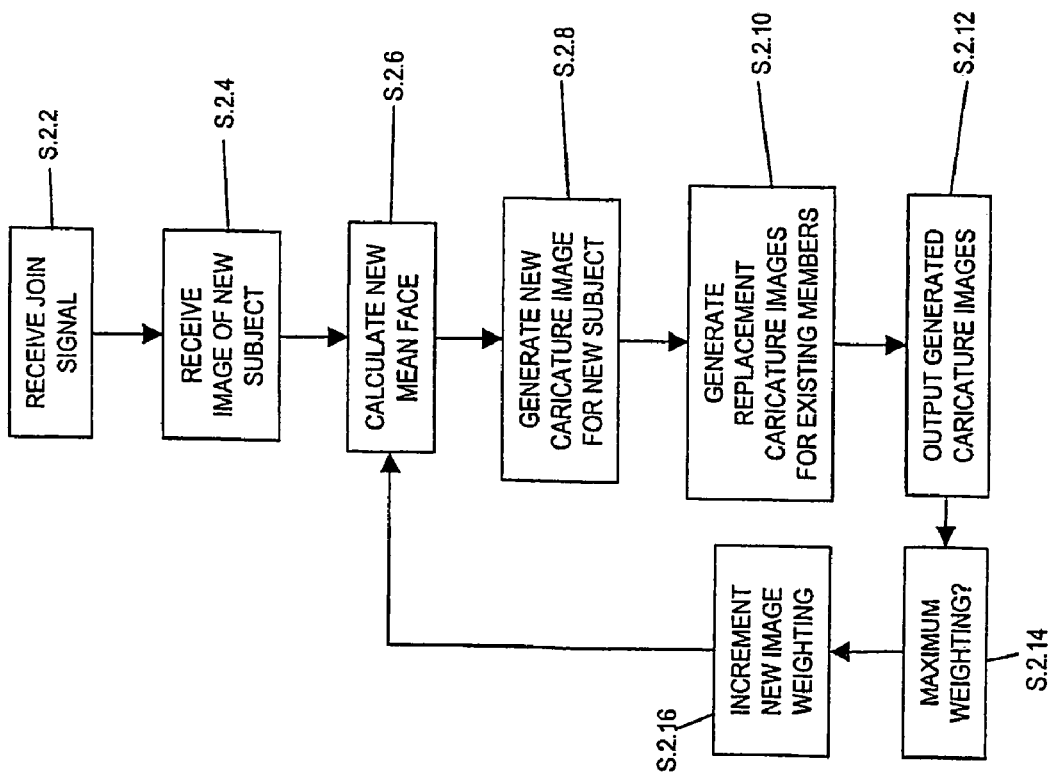
FIG. 2 is a flow diagram illustrating steps performed by the described embodiments of the invention.

With reference to FIG. 2, assume that a closed group of members has been formed using a particular application (such as the messaging application discussed above), and that caricatured image representations are being used to represent each of the members in that application. Moreover, assume also that a server is being used to host the application, and is capable of computing new caricatured image representations when required.

With reference to FIG. 2, assume that a new member is to join the closed group. In this case, within this embodiment the new member signals to the server which is hosting the application which the closed group is using, sending an indication of their wish to join the group, and a facial image of the new subject at step 2.2. The server hosting the application receives this join signal and at step 2.4 receives the image of the subject.

Having received the image of the new subject, in order to maintain the caricatured image representations of the closed group members as being maximally distinguished from each other, it is necessary to recalculate the mean face which is used to generate the caricatured image representations to take into account the image of the new subject received at step 2.4. If, however, the received new facial image is allowed to have the same impact on the new mean face to be calculated as every other facial image of the present group members, then it may be that the caricatured image representations of the present group members would undergo a step change when the new mean face is used to generate replacement caricatured image representations. Whilst in some embodiments of the invention such a step change may be acceptable, in the preferred embodiment a time dependent weighting function is employed which weights the contribution of the new facial image to the mean as a generally increasing function over time. An example of such a function is shown in FIG. 12, which is of a general raised co-sine form, but it should be noted that embodiments of the invention are not limited to such a form of function, and that any time dependent generally increasing function may be used.

Figure 12:
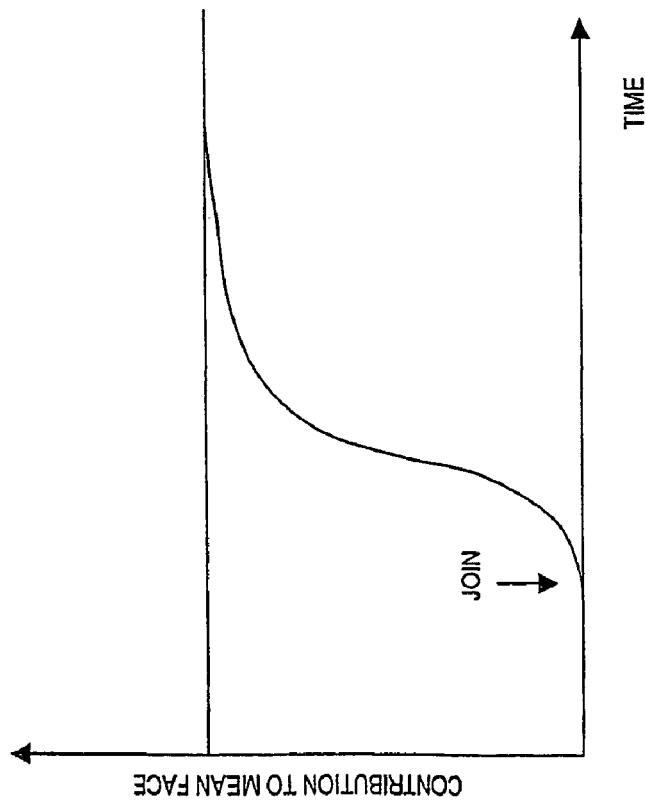
FIG. 12 is a graph of a time dependent weighting function which may be used by preferred embodiment of the invention.
Figure 16:
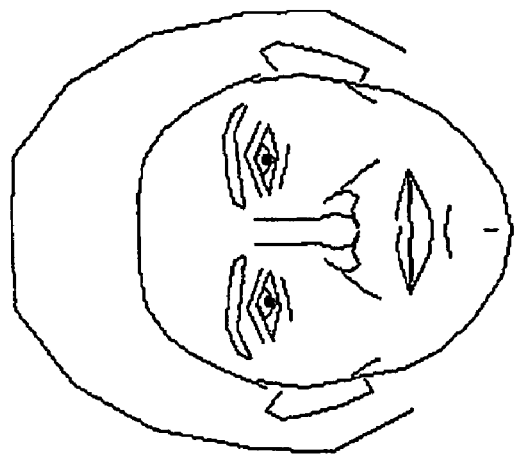
FIG. 16 is an example mean face of the prior art.
Figure 15:
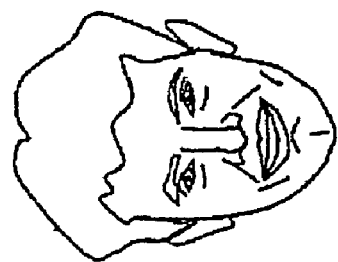
FIG. 15($a$) is a photographic image representation of a Caucasian male.
Figure 15:
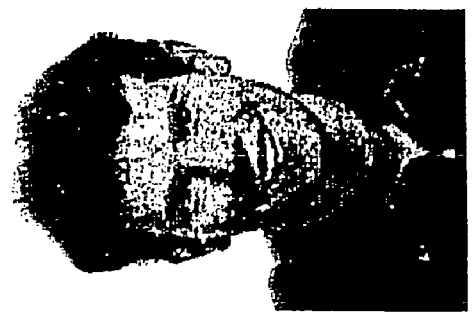

To apply the function to the calculation of the new mean face, at step 2.6 the mean face generator program 22 accesses the data store 18, which may store a look up table or the like which embodies the function of FIG. 12. In the case of a look up table, weighting values to be applied to the received new facial image are indexed against time since the join request was received, such that the first time the new mean face is calculated taking into account the new received facial image, the weighting of the facial image on the resulting new mean face is small. That is, at step 2.6 the mean face generator program 22 calculates a new mean face using the facial images of the existing closed group members, but adding only a small contribution to the mean from the new facial image of the new member who is joining the closed group.

Having obtained such a new mean face, at step 2.8 the caricature generator program 24 generates a new caricature image for the new closed group member, and stores the newly generated caricature image representation in the caricature image store 16. As mentioned previously, the caricature generator program 24 runs any known caricaturing algorithm, such as the Brennan algorithm, for example, to produce the caricatured image representations. Where the algorithm requires or allows a caricature coefficient value to be set by a user, then a user interface to permit such operation is provided by the caricature generator program 24.

Next, at step 2.10 the caricature generator program 24 generates replacement caricature images for each of the existing closed group members, using the new mean face just calculated at step 2.6. The replacement caricature image representations are also stored in the caricature image store 16. Once a replacement caricature image representation has been generated for each of the existing closed group members, all of the newly generated caricature image representations stored in the caricature image store may be output for display and/or storage or other use by the application using the embodiment of the invention.

At this point, therefore, replacement caricature image representations have been generated for each of the existing members, and a new caricature image representation has been generated for the new member who is joining the closed group, but in each case the impact of the facial image of the new member on the mean face which has been used to generate the new caricature image representation images is minimal.

Following step 2.12, processing proceeds to step 2.14 wherein an evaluation is performed to determine whether or not the facial image of the new closed group member has yet been given the maximum weighting in the mean face calculation. If this is the case, i.e. the new member's facial image is given an equal weighting in the mean face calculation to each of the existing member's facial images, then within the context of the embodiment the new member has become fully integrated into the closed group, and hence processing may end. If this is not the case, however, and the new member's facial image has not been given an equal weighting to the existing member's facial images in the mean face calculation, then processing proceeds to step 2.16, wherein the weighting given to the new member's facial image is increased. In this case, where the weighting function is represented by a look up table, the next value may be accessed and used in the subsequent mean face calculation. However the weighting function is implemented, however, it should be understood that on each iteration of the loop comprising steps 2.6 to 2.16, the weighting given to the new member's facial image in the mean face calculation should generally increase.

Once the weighting value has been incremented at step 2.16, processing proceeds back to the mean face calculation at step 2.6, wherein a new mean face is calculated, and the increased weighting of the new member's facial image is used in the new mean face calculation. Processing then proceeds through the steps 2.8, 2.10, and 2.12 back to the evaluation of step 2.14, as previously described.

From the above description and FIG. 2 it should therefore be apparent that the loop formed by steps 2.6 to 2.16 is repeated until the new member has been fully integrated into the closed group. By allowing the impact of the new member's facial image on the mean face calculation to steadily increase over time, and by generating new replacement caricature images for the existing members and the new member each time the weighting is changed, drastic step changes in the appearances of the existing members may be avoided, and the appearances will instead steadily adapt to the inclusion of the new member. In this way the advantages of using a closed group mean to maintain maximum recognisability of each of the caricatured images is maintained, but disturbing large step changes in the appearances of the existing caricatured image representations are avoided.

Similar considerations may also be applied when existing members leave the closed group. The processing performed by embodiments of the invention when an existing member leaves the group will be described next with respect to FIGS. 3, and 13.

Figure 13:
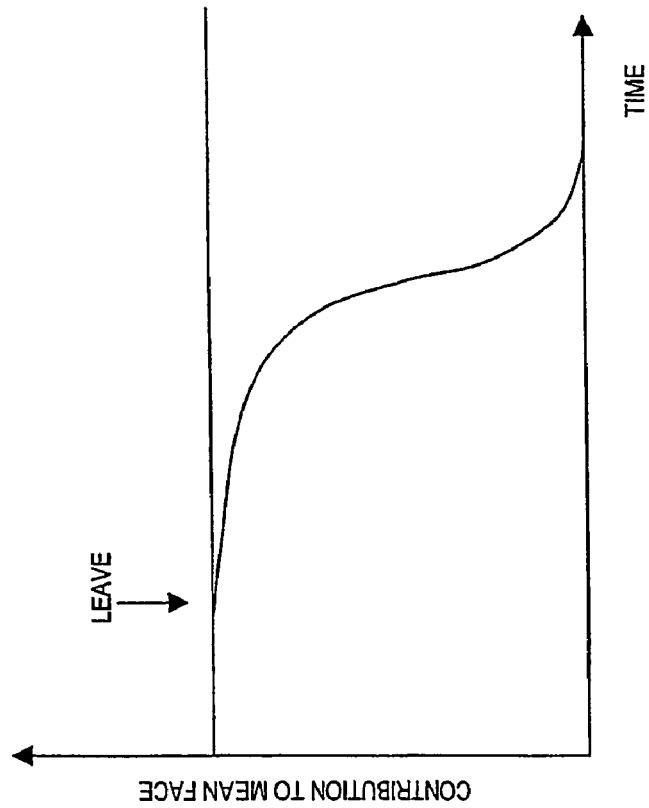
FIG. 13 is a graph of a time dependent weighting function which may be used by preferred embodiment of the invention.

With reference first to FIG. 13, FIG. 13 shows a weighting function which relates the contribution of the facial image of a member who is leaving the group to the mean face over time, in a time dependent generally decreasing manner. As with the joining weighting function of FIG. 12 used when new members joined the closed group, the leaving weighting function of FIG. 13 is a generally raised co-sine function, although a function of this form is not essential, and it should be understood that any time dependent generally decreasing function may be used. Similarly, as with the joining weighting function of FIG. 12, the leaving weighting function of FIG. 13 may be implemented by way of a look-up table or the like stored in the data store 18. Moreover, in other embodiments of the invention where drastic step changes in the caricature image representations are not a concern, such a weighting function need not be used.

Figure 3:
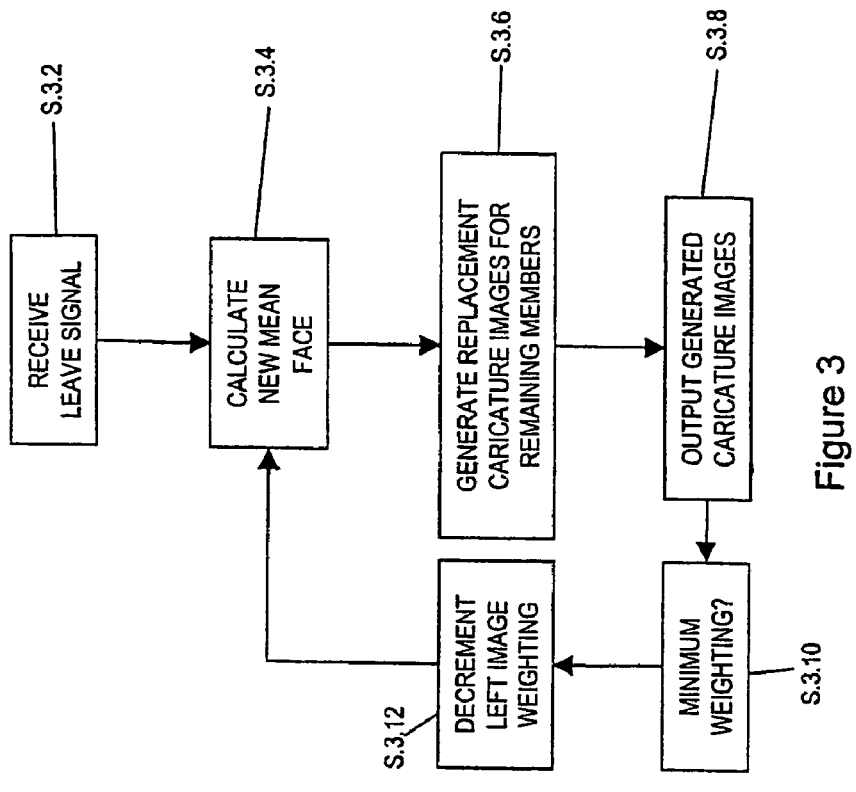
FIG. 3 is a flow diagram illustrating steps performed by the described embodiments of the invention.

Turning now to FIG. 3, this illustrates the process steps which are performed when an existing closed group member wishes to leave the group. Firstly, at step 3.2 the member who wishes to leave the closed group signals the host running the closed group application of his intentions to leave. The host receives the leave signal at step 3.2, and this causes the host to use the mean face generator program 22 to calculate a new mean face at step 3.4 using the facial images of the group members who are to remain, and applying the weighting of FIG. 13 to determine the contribution that the facial image of the member who is to leave the group is to have on the new mean face calculation. Therefore, at step 3.4 the mean face generator program 22 accesses the leave weighting function in the data store 18 to determine the weighting value which should be applied in dependence on the time from when the leave signal is received, and then applies the determined weighting value to the facial image of the member who is to leave the group in the new mean face calculation. The result of step 3.4 is therefore that a new mean face is calculated on the basis of the facial images of the members who are to remain within the group, and also of the facial image of the member who is to leave the group, although partially discounted.

Having obtained a new mean face, at step 3.6 replacement caricature image representations are generated for the closed group members who are to remain, by the caricature generator program 24. The replacement caricature image representations are stored in the caricature image store 16, and also output for display and/or storage, or other use by the application using the embodiment at step 3.8.

Following step 3.8, at step 3.10 an evaluation is performed to determine whether or not the minimum weighting (i.e. zero) is being applied to the facial image of the member who is to leave the group, in the new mean face calculation of step 3.4. If the minimum weighting has been applied, then the result is that the facial image of the member who has left the group will have no impact at all on the new mean face calculation i.e. the mean face generated will simply be the mean of the remaining group members. In such a case the member who has left the group will then have been extricated completely from the group.

If the evaluation at step 3.10 determines the minimum weighting is not being applied, however, at step 3.12 the weighting applied to the left member's facial image is decremented in accordance with the weighting function of FIG. 13. Processing then proceeds back to step 3.4 wherein a new mean face is calculated, using the new lower weighting to determine the extent to which the left member's facial image impact the mean face. The processing loop of steps 3.4 to 3.12 is then continuously repeated until the weighting is reduced to zero.

The effect of such processing is that step changes in the appearances of the remaining group members are avoided, but ultimately over time the facial image of the member who has left the group is no longer represented in the mean face, such that the mean face used to generate the replacement caricature image representations is simply the mean of the remaining members. Such operation ensures that even when members leave the closed group, the caricature image representations may be adapted so as to remain maximally recognisable from each other.

Figure 18:
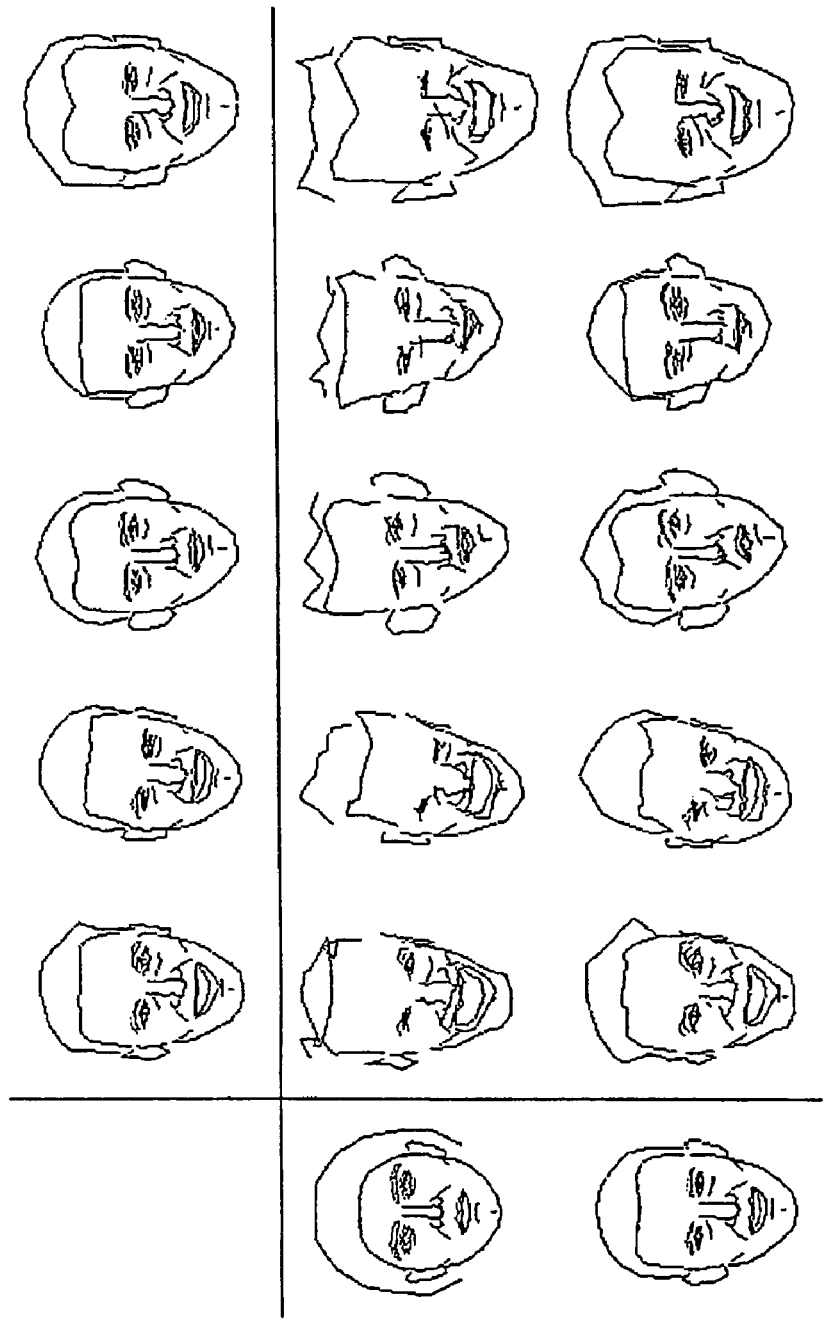
FIG. 18 is a table of caricatured image representations illustrating the effects of using a mean face generated by a closed group of members.
Figure 17:
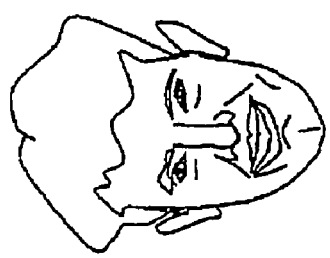
FIG. 17 is an example caricatured image representation generated using the input image of Figure(b), the mean face of FIG. 16, and the prior art Brennan algorithm.
Figure 19:
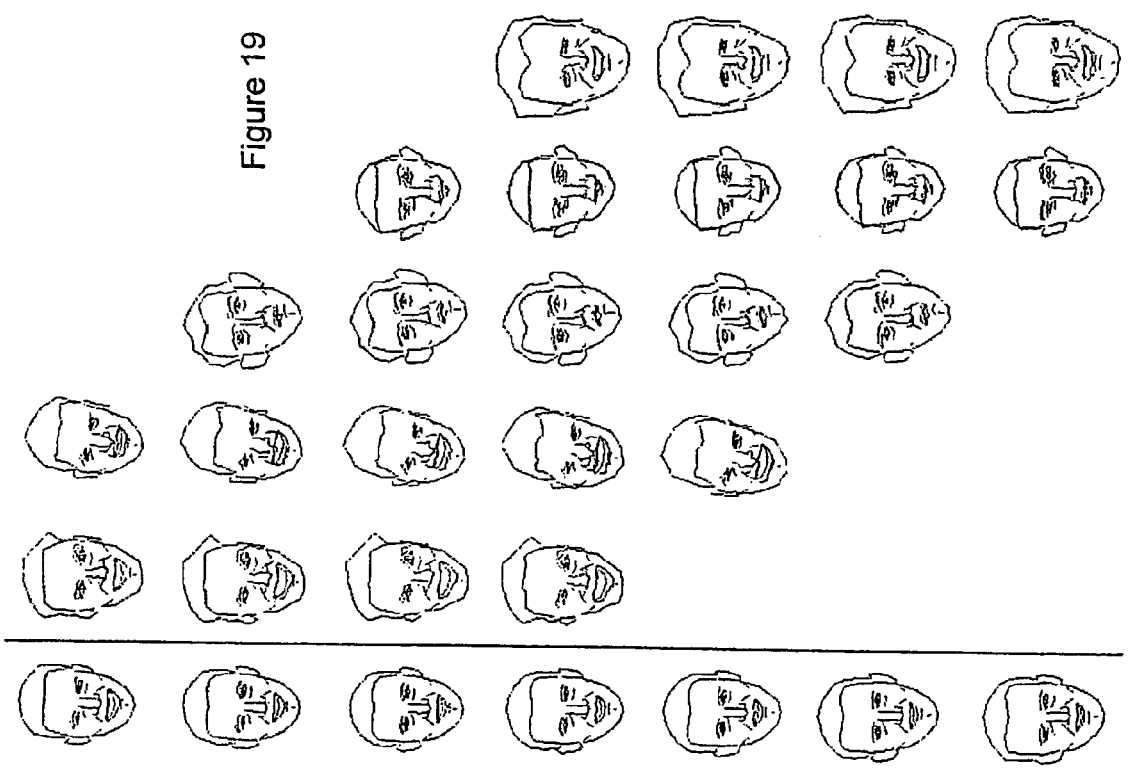
FIG. 19 is a table of caricatured image representations generated according to the embodiments of the invention, and which illustrates the changes in caricatured image representations as members join and leave the closed group.

Example output caricatured image representations of embodiments of the invention which illustrate the adaptive closed group caricaturing effect are shown in FIGS. 18 and 19. These caricatured image representations were generated using line drawing image representations of the closed group members as input images, and by using the Brennan algorithm as the caricaturing technique, with a caricaturing coefficient (b) of −1 (−100%).

The images in the table of FIG. 18 demonstrate the advantage of caricaturing against a closed-group mean, rather than a standard mean. The input images are shown on the top row, the second and third rows show the caricatures with respect to the left-most mean. In the second row the mean is that supplied with the FaceBend application (G. M. Townsend, 1997—http://www.cs.arizona.edu/icon/library/gprogs/facebend.htm) and is comparable to mean faces used in the literature with the Brennan algorithm. In the second row the mean has been calculated from the input images of the faces in this group. This closed-group mean captures the common elements of this set; these examples are of males, between the ages of approximately 18-32 years. As such the shorter hair, thinner eye-brows, larger noses, higher hair lines are captured in the mean and are not emphasised in the resultant caricatures.

The table of images in FIG. 19 demonstrates the dynamic behaviour as faces join and leave the group. In the left-most column the current mean face is presented, calculated as a mean of the closed group consisting of the members whose caricatured image representations are changed with the membership of the group can be observed.

The applications of the embodiments of the invention are many. For example, the invention may find use in messaging applications such as that described previously, or in other visual conferencing applications. Additionally, it is envisaged that the invention may also find much use in online gaming applications, wherein individual players play either in teams or separately, but where individual players may join or leave the game at any time. Where a player is represented in the game by an avatar, the facial features of the avatar may be caricatured in accordance with the principles of the invention such that each player's avatar remains maximally distinguishable from every other.

Further examples of possible uses are in address book applications. Here, an image of a person may be used to represent that person's details in an address book application. In order to ensure that the images are maximally recognisable, an embodiment of the present invention may be used to provide caricatured image representations for use by the application, taking the entries in the address book as the closed group. When an entry is added to the address book then this is the same as a new member joining the closed group of members consisting of the existing address book entries, and the embodiment of the invention is used to compute the new caricatured image representation of the new entry, and also to re-compute the existing caricatured image representations, as described above. Similarly, when an entry is to be deleted from the address book then this is the same as a member leaving the closed group of address book entries, and hence the member leave procedures described above may be used to re-compute caricatured image representations of the remaining entries.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

Moreover, for the avoidance of doubt, where reference has been given to a prior art document or disclosure, whose contents, whether as a whole or in part thereof, are necessary for the understanding of the operation or implementation of any of the embodiments of the present invention by the intended reader, being a man skilled in the art, then said contents should be taken as being incorporated herein by said reference thereto.

What is claimed is:

1. A computerized method of generating caricatured images, said method comprising using at least one programmed computer system to:
   store image representations of subjects and corresponding respective caricatured image representations of the subjects;
   receive an image representation of a new subject; and
   generate a caricatured image representation of the new subject and replacement caricatured image representations of the subjects in dependence on the stored image representations thereof and the received image representation of the new subject.

2. A method according to claim 1, wherein the caricatured image representation/s are generated in weighted dependence on the received image representation of the new subject, wherein a weighting factor associated with the new image representation generally increases with time, and the caricature image representations are re-generated by the at least one computer system each time the weighting factor is adapted.

3. A method according to claim 1, wherein the subjects form a closed group of subjects, and the method is performed whenever a new subject joins the closed group.

4. A tangible storage medium containing a computer program or suite of computer programs arranged such that when executed by a computer system causes the computer system to perform the method of claim 1.

5. A computerized method of generating caricatured images, said method comprising using at least one programmed computer system to:
   store image representations of subjects and corresponding respective caricatured image representations of the subjects;
   receive a leave signal indicating a particular one or more of the subjects for which image representations are stored; and
   generate replacement caricatured image representations in dependence on the stored image representations of the subjects at least partially discounting the image representations of the indicated subjects.

6. A method according to claim 5, wherein the image representations of the indicated subjects are generally increasingly discounted over time in accordance with a weighting factor, wherein the caricature image representations are re-generated each time the weighting factor is adapted.

7. A method according to claim 5, wherein the subjects form a closed group of subjects, and the method is performed whenever one or more of the subjects leave the closed group.

8. A computer readable storage medium storing a computer program or at least one of the suite of computer programs which, when executed by a computer, effects the method according to claim 5.

9. A system for generating caricatured images, said system comprising:
   storage means arranged in use to store image representations of subjects and corresponding respective caricatured image representations of the subjects;
   input means for receiving an image representation of a new subject; and
   processing means arranged in use to generate a caricatured image representation of the new subject and replacement caricatured image representations of the subjects in dependence on the stored image representations thereof and the received image representation of the new subject.

10. A system according to claim 9, wherein the processing means is further arranged to generate the caricatured image representation/s in weighted dependence on the received image representation of the new subject, wherein a weighting factor associated with the new image representation generally increases with time, and the caricature image representations are re-generated each time the weighting factor is adapted.

11. A system according to claim 9, wherein the subjects form a closed group of subjects, and the system is operated whenever a new subject joins the closed group.

12. A system for generating caricatured images, said system comprising:
    storage means arranged in use to store image representations of subjects and corresponding respective caricatured image representations of the subjects;
    means for receiving a leave signal indicating a particular one or more of the subjects for which image representations are stored; and
    processing means arranged in use to generate replacement caricatured image representations in dependence on the stored image representations of the subjects but at least partially discounting the image representations of the indicated subjects.

13. A system, according to claim 12, wherein the image representations of the indicated subjects are generally increasingly discounted over time in accordance with a weighting factor, wherein the caricature image representations are re-generated each time the weighting factor is adapted.

14. A system according to claim 12, wherein the subjects form a closed group of subjects, and the system is operated whenever one or more of the subjects leave the closed group.

15. A computerized method of generating caricatured facial images for a group of different persons to be concurrently displayed, said method comprising using at least one computer system to:
    store a first facial image for each of a group of persons;
    generate and store a second facial image for each of said group of persons, said second image being a caricatured image respectively corresponding to a said first facial image;
    receive a new first facial image for a new person not currently a member of said group;
    generate and store a replacement set of caricatured second facial images for the persons already in the group and the new person as a function of their corresponding first facial images; and
    display said replacement set of caricatured second facial images to represent a new group of persons now including said new person.

16. A method as in claim 15, wherein said generating of caricatured facial images utilizes a caricature weighting factor which increases as a function of time from receipt of the new first facial image.

17. A method as in claim 15, wherein, when a person leaves the group, the method further comprises using said at least one computer system to:
- generate and store another replacement set of caricatured second facial images for the persons left remaining in the group as a function of their corresponding first facial images; and
- display said another replacement set of caricatured second facial images to represent the remaining group of persons.

18. A method as in claim 17, wherein said generating of caricatured facial images utilizes a caricature weighting factor which increases as a function of time from receipt of the new first facial image.

19. A tangible storage medium containing computer program code which, when executed by a computer, effects the method of claim 15.

* * * * *